US011689479B2

(12) United States Patent
Cunningham et al.

(10) Patent No.: US 11,689,479 B2
(45) Date of Patent: *Jun. 27, 2023

(54) GENERATING A USER UNAVAILABILITY ALERT IN A COLLABORATIVE ENVIRONMENT

(71) Applicant: International Business Machines Corporation, Armonk, NY (US)

(72) Inventors: Gerard Cunningham, Sandymount (IE); Elaine Hanley, Lucan (IE); Ronan M. O'Suilleabhain, Raheny (IE); Fred Raguillat, Dunboyne (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 296 days.

This patent is subject to a terminal disclaimer.

(21) Appl. No.: 15/809,817

(22) Filed: Nov. 10, 2017

(65) Prior Publication Data

US 2018/0097750 A1    Apr. 5, 2018

Related U.S. Application Data

(63) Continuation of application No. 14/053,260, filed on Oct. 14, 2013, now Pat. No. 11,588,758, which is a
(Continued)

(51) Int. Cl.
*H04L 51/02* (2022.01)
(52) U.S. Cl.
CPC ..................... *H04L 51/02* (2013.01)
(58) Field of Classification Search
CPC .................................................. H04L 51/02
(Continued)

(56) References Cited

U.S. PATENT DOCUMENTS 4,819,191 A   4/1989 Scully et al.
5,555,346 A   9/1996 Gross et al.
(Continued)

FOREIGN PATENT DOCUMENTS

CN    101207587 A    6/2008
CN    102150401 A    8/2011
(Continued)

OTHER PUBLICATIONS

"Staffindex v1.0—Attendance, Index, Messaging, Phone, Staff," [online] DownloadThat.com © 2001-2012, [retrieved Oct. 12, 2012] retrieved from the Internet<http://www.downloadthat.com/windows/Freeware/Productivity/Database-Tools/StaffIndex_screenshot.htm>, 1 pg.
(Continued)

*Primary Examiner* — Backhean Tiv
(74) *Attorney, Agent, or Firm* — Cuenot, Forsythe & Kim, LLC

(57) ABSTRACT

Generating a user unavailability alert in a collaborative environment. An embodiment can include receiving a user input from a user indicating an unavailability of the user. Responsive to the user input, activity of the user in the collaborative environment can be analyzed to identify whether any pending actions are allocated to the user which relate to other people identified by the user's participation in the collaborative environment. Responsive to determining at least one pending action is allocated to the user which relates to at least one other person identified by the user's participation in the collaborative environment, a first message can be generated to be communicated to the at least one other person indicating the unavailability of the user, and the first message can be communicated to the at least one other person.

18 Claims, 3 Drawing Sheets

Related U.S. Application Data continuation of application No. 13/657,048, filed on Oct. 22, 2012, now abandoned.

(58) Field of Classification Search
USPC .......................................................... 709/206
See application file for complete search history.

(56) References Cited

U.S. PATENT DOCUMENTS

| | | | |
|---|---|---|---|
| 6,101,480 A | 8/2000 | Conmy et al. | |
| 6,167,379 A | 12/2000 | Dean et al. | |
| 6,295,541 B1 | 9/2001 | Bodnar et al. | |
| 6,988,128 B1 | 1/2006 | Alexander et al. | |
| 7,739,210 B2 | 6/2010 | Horvitz et al. | |
| 8,255,256 B2* | 8/2012 | Haynes | G06Q 10/109 705/7.18 |
| 8,533,020 B2 | 9/2013 | Haynes et al. | |
| 8,880,615 B2* | 11/2014 | Tummalapenta | H04L 51/18 709/201 |
| 2002/0165898 A1* | 11/2002 | Duffy | G06Q 10/10 718/102 |
| 2004/0054566 A1* | 3/2004 | J'Maev | G06Q 10/10 705/7.23 |
| 2004/0088362 A1 | 5/2004 | Curbow et al. | |
| 2004/0117528 A1* | 6/2004 | Beacher | G06Q 30/0603 710/111 |
| 2004/0161090 A1 | 8/2004 | Digate et al. | |
| 2004/0243677 A1 | 12/2004 | Curbow et al. | |
| 2005/0091435 A1* | 4/2005 | Han | H04L 65/403 710/310 |
| 2005/0288987 A1 | 12/2005 | Sattler et al. | |
| 2006/0069599 A1* | 3/2006 | Hatoun | G06Q 10/06 705/7.27 |
| 2006/0106661 A1* | 5/2006 | Oikawa | G06Q 10/06312 705/7.41 |
| 2006/0271935 A1* | 11/2006 | Cox | H04L 67/55 718/102 |
| 2007/0016465 A1 | 1/2007 | Schaad | |
| 2007/0179953 A1* | 8/2007 | Mahoney | G06F 21/6218 707/999.009 |
| 2007/0260694 A1 | 11/2007 | Boss et al. | |
| 2007/0282658 A1* | 12/2007 | Brintle | G06Q 10/063114 705/7.15 |
| 2008/0091504 A1 | 4/2008 | Lyle et al. | |
| 2008/0091782 A1* | 4/2008 | Jakobson | G06Q 10/10 709/206 |
| 2008/0120616 A1 | 5/2008 | James et al. | |
| 2008/0127231 A1 | 5/2008 | Shaffer et al. | |
| 2008/0133302 A1 | 6/2008 | Brauninger et al. | |
| 2008/0155471 A1* | 6/2008 | Lynn | H04M 1/2746 715/811 |
| 2008/0167937 A1 | 7/2008 | Coughlin et al. | |
| 2008/0167938 A1 | 7/2008 | Meisels et al. | |
| 2009/0112677 A1* | 4/2009 | Rhett | G06Q 10/1097 705/7.21 |
| 2009/0132331 A1* | 5/2009 | Cartledge | G06Q 10/10 705/7.27 |
| 2009/0171988 A1 | 7/2009 | Kikin-Gil | |
| 2009/0202051 A1* | 8/2009 | Singh | H04M 1/642 379/88.19 |
| 2009/0282104 A1* | 11/2009 | O'Sullivan | H04L 51/043 709/204 |
| 2009/0319926 A1* | 12/2009 | Chakra | G06Q 10/109 715/764 |
| 2010/0036929 A1 | 2/2010 | Scherpa et al. | |
| 2010/0131598 A1* | 5/2010 | Ruelas-Arana | G06Q 10/06 709/206 |
| 2010/0174579 A1* | 7/2010 | Hughes | G06Q 10/067 705/348 |
| 2010/0241483 A1 | 9/2010 | Haynes et al. | |
| 2010/0250322 A1* | 9/2010 | Norwood | G06Q 10/06311 715/764 |
| 2011/0055177 A1* | 3/2011 | Chakra | G06F 16/176 707/E17.014 |
| 2011/0063440 A1 | 3/2011 | Neustaedter et al. | |
| 2012/0203588 A1* | 8/2012 | Burri | G06Q 10/06311 705/7.14 |
| 2012/0239451 A1* | 9/2012 | Caligor | G06Q 10/00 705/7.21 |
| 2012/0296859 A1 | 11/2012 | Haynes et al. | |
| 2013/0060594 A1* | 3/2013 | Motoyama | G06Q 10/1097 705/7.21 |
| 2014/0006078 A1* | 1/2014 | McGauley | G06Q 10/06 709/204 |
| 2014/0115069 A1* | 4/2014 | Cunningham | H04L 51/02 709/206 |
| 2014/0115077 A1* | 4/2014 | Cunningham | H04L 51/02 709/206 |
| 2016/0098298 A1* | 4/2016 | Trefler | G06F 9/5027 718/104 |
| 2018/0097750 A1* | 4/2018 | Cunningham | H04L 51/02 |

FOREIGN PATENT DOCUMENTS

| | | |
|---|---|---|
| CN | 102577367 A | 7/2012 |
| CN | 103777940 A | 5/2014 |

OTHER PUBLICATIONS

"Collaborative Out of Office Facilitator," IP.com Prior Art Database, No. IPCOM000195039D, Apr. 19, 2010, 4 pg.

"Savance EIOBoard Electronic In Out Board," [online] Savance. com © 2011 [retrieved Oct. 22, 2012] retrieved from the Internet: <http://www.savance.com/Products/EIOBoard>, 1 pg.

Quan-Haase, A. et al., "Instant messaging for collaboration: A Case Study of a High-Tech Firm," [online] Journal of Computer-Mediated Communication, vol. 10, No. 4, Art. 13, 2005 [retrieved Feb. 9, 2012] retrieved from the Internet <http://jcmc.indiana.edu/vol10/issue4/quan-haase.html>, 20 pgs.

Padwick, "Special Edition: Using Microsoft Outlook 2002", 2001, Published by Que Publishing, p. 423-424, 450-451.

"Email Responder for Microsoft Outlook," <http://www.e-mailresponder.com/default.asp>, 1999-2008, 4Team Corporation, Mar. 18, 2009.

"Email Responder for Microsoft Outlook, Features," <http://www.e-mailresponder.com/WebHelp/e-Mail_Responder_Help.htm#Features.htm>, 1999-2008, 4Team Corporation, Mar. 18, 2009.

U.S. Appl. No. 13/550,779, Non-final Office Action, 9 pg.
U.S. Appl. No. 13/550,779, Notice of Allowance, 9 pg.
U.S. Appl. No. 12/406,649, Non-final Office Action, 24 pg.
U.S. Appl. No. 12/406,649, Final Office Action, 27 pg.
U.S. Appl. No. 12/406,649, Notice of Allowance, 8pg.
U.S. Appl. No. 13/657,048, Non-Final Office Action, dated Sep. 25, 2014, 13 pg.
U.S. Appl. No. 13/657,048, Non-Final Office Action, dated Apr. 24, 2015, 13 pg.
U.S. Appl. No. 13/657,048, Final Office Action, dated Sep. 21, 2015, 13 pg.
U.S. Appl. No. 13/657,048, Advisory Action, dated Feb. 17, 2016, 4 pg.
U.S. Appl. No. 13/657,048, Examiner's Answer, dated Oct. 28, 2016, 9 pg.
U.S. Appl. No. 13/657,048, Decision on Appeal, Jun. 21, 2017, 8 pg.
U.S. Appl. No. 13/657,048, Notice of Abandonment, dated Sep. 7, 2017, 3 pg.
U.S. Appl. No. 14/053,260. Non-Final Office Action, dated Feb. 4, 2016, 15 pg.
U.S. Appl. No. 14/053,260, Final Office Action, dated Jul. 19, 2016, 18 pg.
U.S. Appl. No. 14/053,260, Examiner's Answer, dated Mar. 24, 2017, 16 pg.
U.S. Appl. No. 14/053,260, Decision on Appeal, Jul. 31, 2017, 8 pg.

\* cited by examiner

GENERATING A USER UNAVAILABILITY ALERT IN A COLLABORATIVE ENVIRONMENT

BACKGROUND

The use of real time collaboration and other forms of user collaboration have proven useful for contributing to high levels of user productivity. Real time collaboration involves use of the Internet and presence technology for people to communicate amongst themselves. Further, real time collaboration involves several kinds of synchronous communication tools such as instant messaging, group chat sessions, web conferencing, telephone calls and telephone conferences. Other forms of collaboration include the use electronic mail (email), and the like.

BRIEF SUMMARY

One or more embodiments disclosed within this specification relate to generating a user unavailability alert in a collaborative environment.

An embodiment can include receiving a user input from a user indicating an unavailability of the user. Responsive to the user input, via a processor, activity of the user in the collaborative environment can be analyzed to identify whether any pending actions are allocated to the user which relate to other people identified by the user's participation in the collaborative environment. Responsive to determining at least one pending action is allocated to the user which relates to at least one other person identified by the user's participation in the collaborative environment, a first message can be generated to be communicated to the at least one other person indicating the unavailability of the user, and the first message can be communicated to the at least one other person. In one arrangement, the first message can indicate a new completion time or date for the pending action.

Another embodiment can include a system including a processor configured to initiate executable operations. The executable operations can include generating a user unavailability alert in a collaborative environment. The executable operations further can include receiving a user input from a user indicating an unavailability of the user. Responsive to the user input, activity of the user in the collaborative environment can be analyzed to identify whether any pending actions are allocated to the user which relate to other people identified by the user's participation in the collaborative environment. Responsive to determining at least one pending action is allocated to the user which relates to at least one other person identified by the user's participation in the collaborative environment, a first message can be generated to be communicated to the at least one other person indicating the unavailability of the user, and the first message can be communicated to the at least one other person.

Another embodiment can include a computer program product for generating a user unavailability alert in a collaborative environment. The computer program product can include a computer readable storage medium having program code embodied therewith, the program code executable by a processor to perform a method including receiving, by the processor, a user input from a user indicating an unavailability of the user. Responsive to the user input, by the processor, activity of the user in the collaborative environment can be analyzed to identify whether any pending actions are allocated to the user which relate to other people identified by the user's participation in the collaborative environment. Responsive to determining at least one pending action is allocated to the user which relates to at least one other person identified by the user's participation in the collaborative environment, a first message can be generated, by the processor, to be communicated to the at least one other person indicating the unavailability of the user, and the first message can be communicated, by the processor, to the at least one other person.

DETAILED DESCRIPTION

Figure 1:
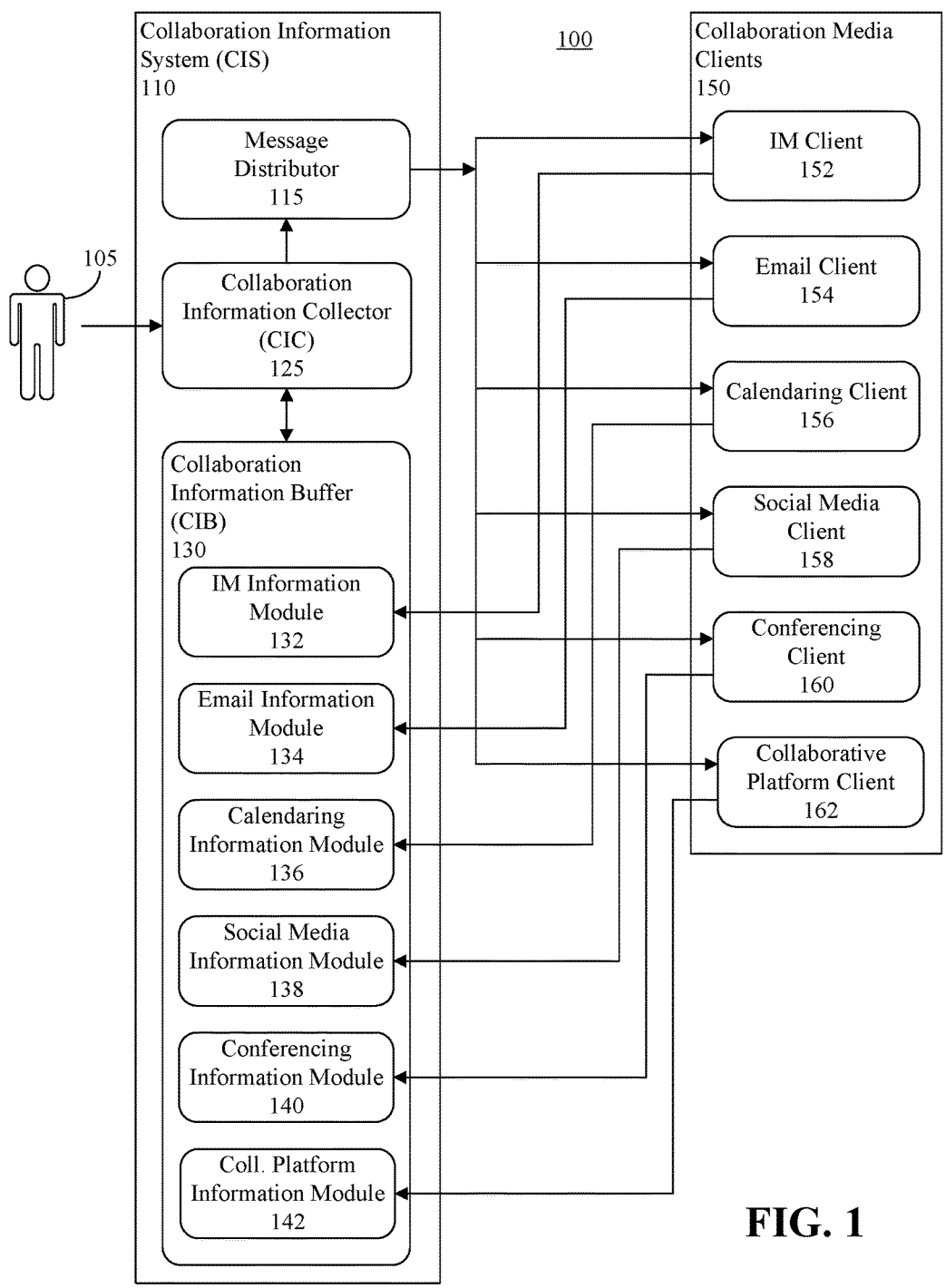
FIG. 1 is a block diagram illustrating a system for generating a user unavailability alert in a collaborative environment in accordance with one embodiment disclosed within this specification.

As will be appreciated by one skilled in the art, aspects of the present invention may be embodied as a system, method or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to generating a user unavailability alert in a collaborative environment. A user may encounter a situation that influences the user to focus attention away from a subject of a collaborative session. For example, the user may be assigned an action unrelated to a current collaborative session, called home, or otherwise be distracted. The user can enter a user input indicating that the user is to be unavailable, for example by selecting a panic button. When the user indicates such, the user's activity in a collaboration session can be analyzed to identify whether any pending actions are allocated to the user which relate to other people identified by the user's participation in the collaborative environment. If so, a message can be communicated to one or more other participants in the collaborative environment indicating the unavailability of the user.

FIG. 1 is a block diagram illustrating a system (hereinafter "system") 100 for generating a user unavailability alert in a collaborative environment in accordance with one embodiment disclosed within this specification. As used herein, the term collaborative environment means an environment in which users collaborate via one or more communication networks. Aspects of a collaborative environment may include, but are not limited to, electronic mail (email), text messaging, instant messaging (IM), telephone calls, telephone conferences, video conferences, web conferences, social media (e.g., via social networking sites), calendaring applications, and/or the like. Within a collaborative environment, a user 105 may participate in one or more collaborative sessions. Each collaborative session may include user participation in one or more aspects of the collaborative environment. Further, each collaborative session can pertain to a particular subject, for example a project. One or more users can be assigned actions (e.g., tasks) pertaining to the particular subject. Further, one or more participants may be assigned responsibility for monitoring the progress of other participants on assigned actions (e.g., pending actions), or may otherwise be impacted by the progress of other participants on assigned actions.

As used herein, the term "participant" means a person (i.e., human being) who participates in one or more collaborative sessions. As used herein, the term "user" also means a person (i.e., human being) who participates in one or more collaborative sessions. Herein, the term "user" is used to distinguish a particular person who participates in one or more collaborative sessions from one or more other people who participant in one or more collaborative sessions. Thus, the term "user" means a particular participant.

The system 100 can include a collaborative information system (CIS) 110.

The collaborative information system 110 can include a message distributor 115, a collaboration information collector (CIC) 125 and a collaboration information buffer (CIB) 130. The CIB 130 can be configured to collect collaborative information related to use by a user 105 of various collaboration media, such as IMs, electronic mail (email), calendaring entries, social media, conferencing media and the like. In this regard, the CIB 130 can include various modules for collecting such information, for example an IM information module 132, an email information module 134, a calendaring information module 136, a social media information module 138, a conferencing information module 140, a collaborative platform information module 142, and the like.

The system 100 further can include collaboration media clients 150 which store/record collaboration media, or have access to the stored/recorded collaboration media, and from which the CIB 130 collects the collaborative media. In illustration, the collaboration media clients 150 can include an IM client 152, an email client 154, a calendaring client 156, a social media client 158, a conferencing client 160, a collaborative platform client 162, and/or the like. The collaborative platform client 162 can be configured to include email, calendaring, social media, conferencing, unified messaging and/or other functionality. In this regard, the collaborative platform client 162 can be included in addition to, or in lieu of, one or more of the clients 152-160. Examples of a collaborative platform client 162 include, but are not limited to, IBM® Real-time Collaboration, IBM® Lotus® Connections, and the like. (IBM and Lotus are trademarks of International Business Machines Corporation in the United States, other countries, or both).

The clients 152-162 can be implemented as one or more applications executed by the system 100. In one example, one or more of the clients 152-162 can be implemented as a web browser that accesses one or more suitable web servers that provide and receive from the system 100 corresponding data. In this regard, the web browser can be executed to operate as an IM client session, an email client session, a calendaring client session, a social media session, a conferencing session and/or the like. The present arrangements are not limited to use of a web browser, however. For example, the email client 154 and the calendaring client 156 can be implemented by an application configured to operate as a client for such operations. In another example, the conferencing client 160 can be a component of a telephone system, such as a VoIP telephone system, and may include telephone call recording capabilities. Still one or more applications can be configured to operate as clients as described herein and the present arrangements are not limited in this regard.

In operation, the user 105 can enter a user input into the system 100 indicating that the user 105 will be unavailable. For example, via a user interface (such as a graphical user interface (GUI)) one or more controls, such as icons, buttons, menu items, widgets or the like, can be presented to the user 105 on a display, and configured to receive the user input. In another arrangement, one or more controls, such as one or more buttons, keys, or the like, can be provided on a mouse, track pad, touch pad, keyboard, display or other device and the system 100 can be configured to recognize a selection by the user of such control(s) indicates that the user 105 will be unavailable. In response to the user input, a user unavailability alert in the collaborative environment can be generated, for example as one or more messages, which are described herein.

When the user decides that the user will become unavailable, the user 105 can select any one or more of the described controls to indicate the user's unavailability. In one arrangement, the control can be a panic button selectable by the user 105 to indicate that the user 105 is unavailable until further notice. Other than selection by the user, the panic button need not require further user input. In another arrangement, when the user 105 selects the control, the user 105 can be prompted to indicate how long the user 105 estimates that he/she will be unavailable, a data and/or time when the user 105 expects to again be available, etc.

When the user 105 selects the control to indicate the user's unavailability, the CIC 125 can initiate the CIB 130 to collect collaboration media from the various clients 152-162 and store, at least temporarily, the collaboration media in the respective modules 132-142. As used herein, the term "collaboration media" means any media generated during a collaboration session, for example, text, audio, video, images, slides, and so on. The collaboration media can be media from collaborative sessions in which the user 105 participated, for example within the last hour, the last day, the last week, the last month, the last year, etc. In illustration, if the user 105 participated in a particular collaboration session in the last day, all media from that collaboration session can be retrieved, or the CIB 130 can filter the collaboration media to only retrieve recent collaboration media, for example within the last day, the last week or the last month. The CIB 130 also can filter collaboration media to ignore off topic media and/or previously sent unavailability messages, which will be described herein.

The CIC 125 can access the collaboration media from the CM 130 and process such collaboration media to generate statistical data based upon the collaboration media and/or the user's activity (e.g., participation) in the collaboration sessions. When processing text media (e.g., IMs, emails, calendaring information, etc.), the CIC can apply text analysis to generate the statistical data. When processing audio collaborative media, the CIC 125 can apply speech-to-text analyses to generate a transcript of the audio which may be processed to generate the statistical data. When processing video collaborative media and/or collaborative media that contain still images, the CIC 125 can apply image recognition to generate related data, and process the related data to generate the statistical data.

The statistical data can identify collaboration sessions in which the user 105 participated, those collaboration sessions in which the user 105 participated heavily, those collaboration sessions in which the user 105 participated moderately, those collaboration sessions in which the user 105 participated minimally, and so on. The statistical data also can identify relative percentages of the user's total collaboration activity with regard to the user's participation in specific collaboration sessions. Further, based on the analysis of the collaboration media, the CIC 125 can identify other participants who participated in the collaboration sessions, any actions allocated (e.g., assigned) to the user 105, actions allocated by the user 105 to one or more other participants, the status of such actions, and so on. Such actions may be pending actions or actions that have been completed. Still, the CIC 125 can generate any other data relevant to the user's participation in the collaborative sessions and the present arrangements are not limited in this regard.

In one aspect, to determine the status of actions allocated to the participant or allocated to other participants, the CIC 125 can determine an amount of work completed on such actions. For example, the CIC 125 can determine a scheduled length of an action, the amount of work required to complete the action, the amount of work already completed on the action, and do on. In one arrangement, the CIC 125 can interface with a collaboration tool, for example IBM® Rational Team Concert™, to obtain such information related to the allocated actions. (Rational Team Concert is a trademark of International Business Machines Corporation in the United States, other countries, or both).

Further, the CIC 125 can determine whether other participants in the collaborative sessions may be impacted by, or otherwise should be notified of, the user's unavailability. If so, the CIC 125 can interface with the message distributor 115 to generate and communicate one or more messages to such participants via the collaboration media clients 150 indicating the user's unavailability. In illustration, the message distributor 115 can send one or more IMs via the IM client 152, one or more emails via the email client 154, add/update one or more calendar entries via the calendaring client 156, send one or more messages via the social media client 158, send one or more messages via the conferencing client 160, and so on. In one arrangement, the type of client 152-162 selected for sending the message(s) can be based on the type of client used by the user 105 when collaborating with the other participant(s) when the action was assigned to the user 105.

For example, the user 105 may select the control via the GUI indicating that the user 105 is unavailable. In response, the CIC 125 can analyze the collaboration session media and identify information indicating the user 105 was allocated an action to be completed this afternoon. The CIC 125 also may determine that whether action is yet completed. If the user 105 did not indicate, via the control, that the user 105 will return this afternoon, and the action is not yet completed, the CIC 125 automatically generate and can send one or more messages to the participant who allocated to action to the user 105, and/or to one or more other participants collaborating in the collaboration session in which the action was assigned, indicating that the action allocated to the user 105 may not be completed as original scheduled. Accordingly, the participants will be apprised that the user 105 may not be able to complete the task by the target date/time. An example of such message may include a statement generated on behalf of the user 105, for example, "Due to unforeseen circumstances, I am unable to complete the assigned task I promised for today."

If when selecting the control the user 105 indicated a date/time when the user 105 again will be available, the CIC 125 can estimate an amount of work left to be completed on the task, for example by comparing the amount of work completed to the anticipated amount of work required for the task, and estimate when the user 105 should be able to complete the allocated action. The CIC 125 can communicate with the message distributor 115 to include in the message(s) that are sent the estimated date/time when the action will be completed by the user 105. For example, the message(s) may include a statement "Due to unforeseen circumstances, I am unable to complete the assigned task I promised for today. I do, however, believe I can complete the task by Monday."

Further, the CIC 125 can estimate a probability of the action being completed by a certain time/date. For example, if today is Thursday, and the user 105 selects the unavailability control, and a pending action to be completed by the user is not due until next Monday, the CIC 125 can evaluate the amount of work necessary to complete the task, an amount of work already completed on the task, and the amount of other actions the user 105 is tasked with for Friday and Monday. When evaluating the other actions the user 105 is tasked with, the CIC 125 can identify a priority of the present action and compare the priority of the present action with the priorities of the other actions. If the present action has higher priority than the other actions, the CIC 125 can automatically reschedule the due dates/times of the other actions. If the present action does not have higher priority, the CIC 125 can schedule the present action around the other actions. Based on this information, the CIC 125 can estimate a probability percentage (e.g., 60%) that the user will be able to complete the task by Monday. This probability percentage can be indicated in the message(s) that are sent to the other participant(s). For example, the message(s) may include a statement "Due to unforeseen circumstances, I am unable to complete the assigned task I promised for today. I believe the probability I will complete the task by Monday is 60%."

The CIC 125 can estimate the probability percentage based on a number of parameters. For example, the CIC 125 can process a parameter representing a typical duration of unavailability, the position of the day when the user 105 becomes unavailable with respect to the weekend (e.g., the probability the user 105 still being unavailable on Monday when the unavailability period begins on Friday), and so on. Of course, if the user specifies how long the user anticipates he/she will be unavailable when selecting the unavailability control, the CIC 125 can process this data in lieu of a typical duration of unavailability.

Further, if the one or more other actions are rescheduled to accommodate rescheduling of the present action, the CIC 125 can implement the processes described herein to identify one or more other participants who should be notified of such rescheduling, and interface with the message distributor 115 to generate one or more message(s) to the other participant(s) indicating rescheduling of such tasks, the probability of such tasks being completed at the rescheduled date(s)/time(s), and so on.

As noted, in some instances, a collaboration session may take place using audio information, for example in a teleconference or web conference. In such instances, the message(s) can be provided as audio information. For example, text to speech synthesis can be applied to message text that is automatically generated by the CIC 125 to generate a corresponding audio message. The audio message can be sent to other participant(s) via one or more clients 152-162 suitable for communicating audio messages. Further, the user's telephone system can be automatically configured to monitor incoming calls from the other participant(s), and when such a call is received, present (e.g., telephonically communicate) the audio message as a call answer message (e.g., using a voice mail system). A contact list maintained for the user 105 can indicate contact names, telephone numbers, extension numbers, email addresses, IM identifiers, IP addresses, and the like, and can be accessed by the CIC 125 to determining whether an incoming call is from another participant in a collaborative session. In this regard, the audio message can be personalized for the caller.

The CIC 125 can initiate collection of collaboration media into the CIB 130, processing of such media, and generating of the message(s) in real time when the user 105 selects the unavailability control. As used herein, the term "real time" means a level of processing responsiveness that a user 105 or system senses as sufficiently immediate for a particular process or determination to be made, or that enables the processor to keep up with some external process. Further, the CIC 125 can implement any suitable algorithms to arrive at any statistical determinations made by the CIC 125.

In an arrangement in which the user 105 selects the unavailability control, but does not indicate when the user 105 again will become available, the CIC 125 can monitor the availability status of the user 105. For example, the CIC 125 can monitor for a selection by the user 105 of a control in the GUI indicating that the user is available, or monitor for an event related to the user 105 logging into the system 100. When the user 105 logs into the system, the CIC 125 can prompt the user to indicate whether the user 105 wishes to change his/her status to being available, or to keep the status as unavailable, and receive a corresponding response from the user.

While the user 105 remains unavailable, and has not indicated when he/she will again be available within a specified period of time subsequent to initially indicating the user unavailability, the CIC 125 can periodically initiate the CIB 130 to update the collaborative session information maintained in the modules 132-142, and the CIC 125 can analyze the updated session information. Further, the CIC 125 can interface with the message distributor 115 to send updated messages indicating the user 105 still is unavailable, provide updated estimates of when (e.g. time and/or date) assigned actions will be completed, etc. The period between updates can be, for example one or more hours, one or more days, one or more weeks, etc. When the CIC 125 detects that the user 105 becomes available, the CIC 125 can cease the updates of the session information in the CIB 130, cease further analysis processes on the session information, and cease sending further messages, at least until the user 105 again becomes unavailable, or another participant in the collaborative sessions becomes unavailable.

Figure 2:
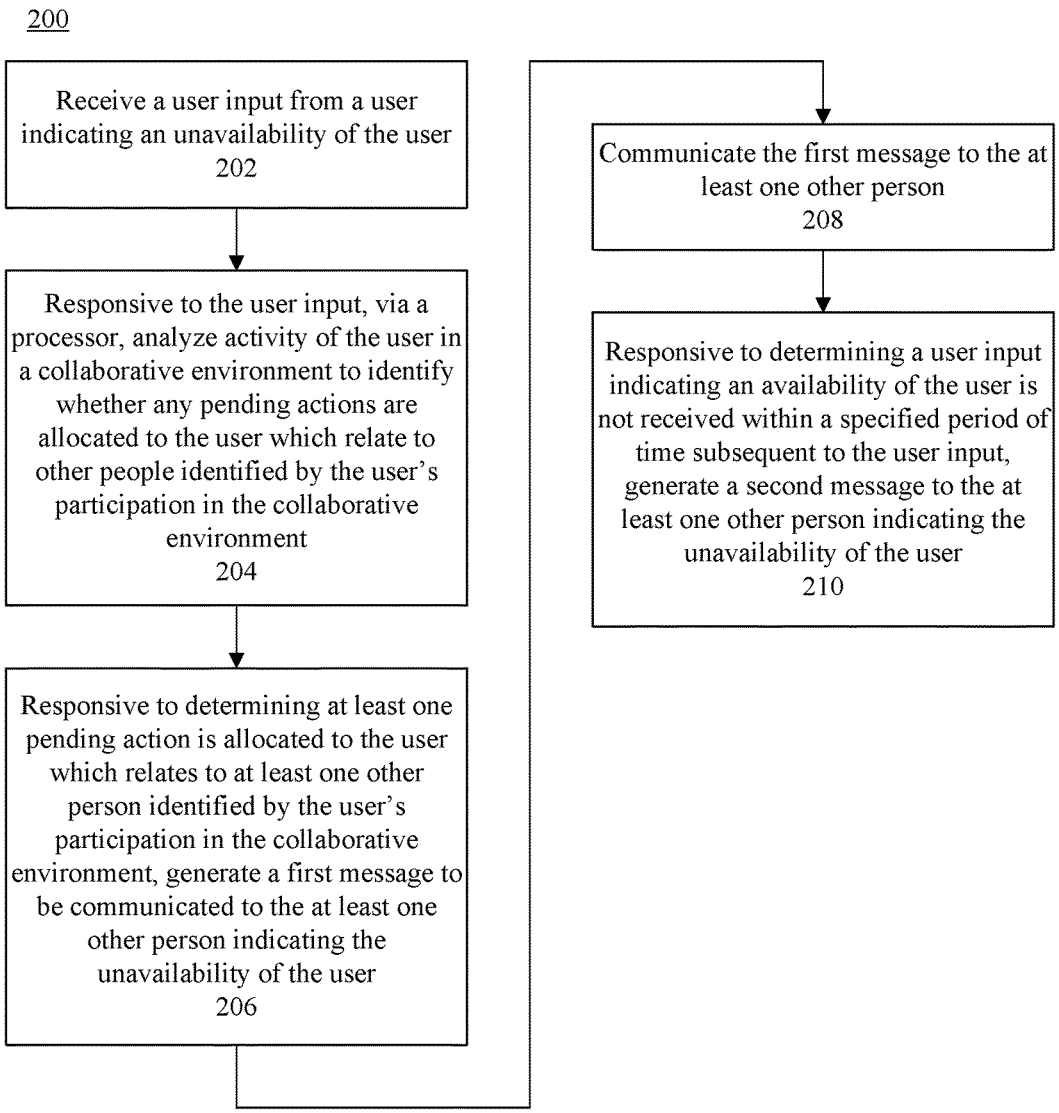
FIG. 2 is a flow chart illustrating a method of generating a user unavailability alert in a collaborative environment in accordance with an embodiment disclosed within this specification.

FIG. 2 is a flow chart illustrating a method 200 of generating a user unavailability alert in a collaborative environment in accordance with an embodiment disclosed within this specification. At step 202, a user input can be received from a user indicating an unavailability of the user. At step 204, responsive to the user input, via a processor, activity of the user in the collaborative environment can be analyzed to identify whether any pending actions are allocated to the user which relate to other people (e.g., other participants) identified by the user's participation in the collaborative environment.

At step 206, responsive to determining at least one pending action is allocated to the user which relates to at least one other person identified by the user's participation in the collaborative environment, a first message can be generated to be communicated to the at least one other person indicating the unavailability of the user. Further, the first message can indicate that a completion time or date of the pending action allocated to the user is affected by the unavailability of the user.

In one arrangement, responsive to determining at least one pending action is allocated to the user which relates to at least one other person identified by the user's participation in the collaborative environment, a probability the user will be able to complete the pending action by an assigned time or date can be automatically determined. In this arrangement, the first message can indicate the probability the user will be able to complete the pending action by the assigned time or date.

In another arrangement, responsive to determining at least one pending action is allocated to the user which relates to at least one other person identified by the user's participation in the collaborative environment, the pending action can be automatically re-scheduled. In this arrangement, a new completion date or time of the pending action allocated to the user can be automatically estimated, for example as described herein, and the first message can indicate the new completion time or date for the pending action. The message further can indicate a probability that the action will be completed at the new completion date or time.

In another arrangement, the first message can be a personalized audio message to be presented to the at least one other person identified by the user's participation in the collaborative environment. The personalized audio message can be telephonically communicated to the at least one other person in response to a telephone call to the user being received from the at least one of the other person.

At step 208, the first message can be communicated to the at least one other person.

At step 210, responsive to determining a user input indicating an availability of the user is not received within a specified period of time subsequent to the user input, a second message to the at least one other person can be generated indicating the unavailability of the user. For example, a new completion time or date of the pending action allocated to the user can be automatically estimated, and the second message further can indicate the new completion time or date. The second message also can indicate the probability of the user completing the allocated action by the new completion time or date.

Figure 3:
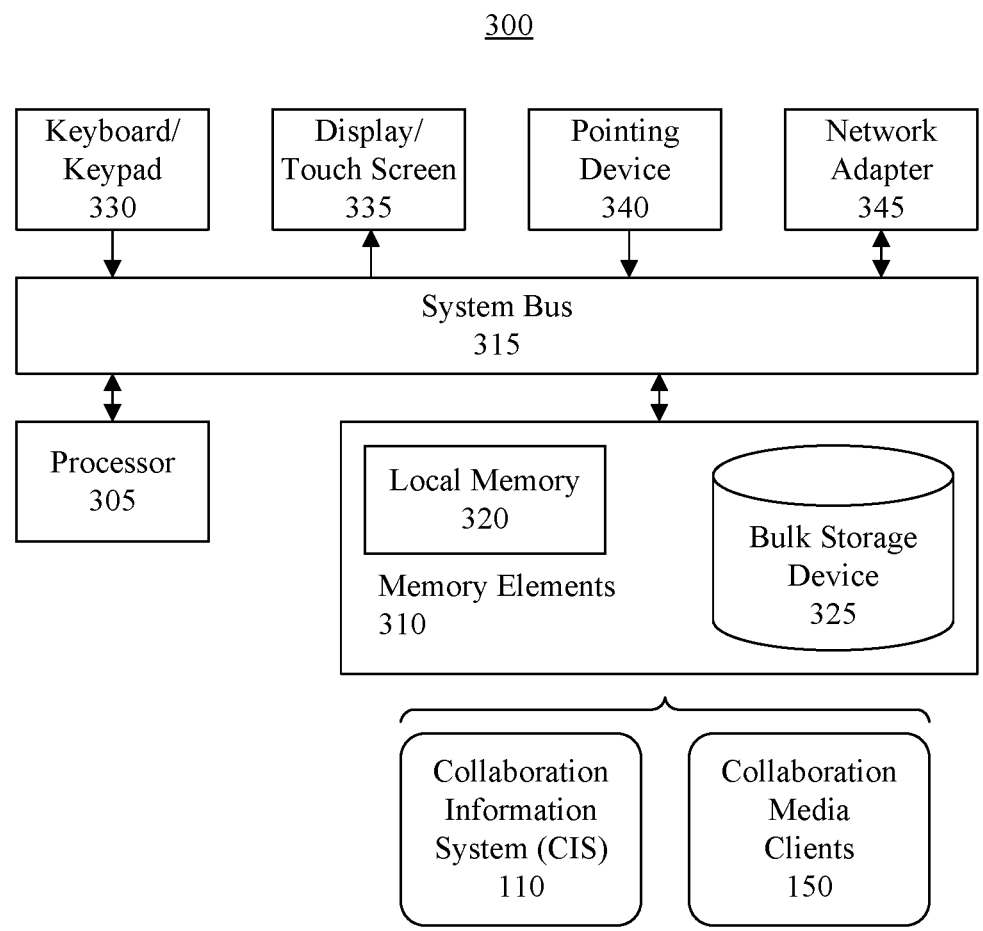
FIG. 3 is a processing system configured to generate a user unavailability alert in a collaborative environment in accordance with an embodiment disclosed within this specification.

FIG. 3 is a processing system 300 configured to generate a user unavailability alert in a collaborative environment in accordance with an embodiment disclosed within this specification.

The processing system 300 can include at least one processor 305 (e.g., a central processing unit) coupled to memory elements 310 through a system bus 315 or other suitable circuitry. As such, the processing system 300 can store program code within the memory elements 310. The processor 305 can execute the program code accessed from the memory elements 310 via the system bus 315. It should be appreciated that the processing system 300 can be implemented in the form of any system including a processor and memory that is capable of performing the functions and/or operations described within this specification. For example, the processing system 300 can be implemented as a computer, a workstation, a mobile computer, a laptop computer, tablet computer, a smart phone, a personal digital assistant, a gaming device, an appliance, and so on.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as a hard disk drive (HDD), solid state drive (SSD), or other persistent data storage device. The processing system 300 also can include one or more cache memories (not shown) that provide temporary storage of at least some program code in order to reduce the number of times program code must be retrieved from the bulk storage device 325 during execution.

Input/output (I/O) devices such as a keyboard and/or keypad 330, a display and/or touchscreen 335, a pointing device 340 and/or a network adapter 345. The I/O devices can be coupled to the processing system 300 either directly or through intervening I/O controllers. Modems, cable modems, and Ethernet cards are examples of different types of network adapters 345 that can be used with processing system 300.

As pictured in FIG. 3, the memory elements 310 can store the components of the system 100 of FIG. 1, namely the CIS 110 and the collaboration media clients 150. Being implemented in the form of executable program code, these components of the system 100 can be executed by the processing system 300 and, as such, can be considered part of the processing system 300. Moreover, the CIS 110 and the collaboration media clients 150 are functional data structures that impart functionality when employed as part of the processing system 300 of FIG. 3. In illustration, the CIS 110 and collaboration media clients 150 can be executed by the processor 305 to implement the processes and functions respectively describe herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer hardware system configured to generate a user unavailability alert in a collaborative environment, comprising:
   a hardware processor configured to initiate the following executable operations:
      receiving, by the computer hardware system and from a graphical user interface of a collaboration media client associated with a user, a user input indicating an unavailability of the user;
      automatically retrieving, responsive to the user input, collaboration media associated with the user;
      processing, by a collaboration information collector of the computer hardware system, the collaboration media to generate statistical data;
      automatically identifying, by the computer hardware system and based upon the processing of the collaboration media:
         a collaborative session within the collaborative environment and in which the user participated,
         a pending action to be performed by the user within the identified collaborative session, and
         a second participant of the identified collaborative session;
      automatically determining, by the computer hardware system, a completion time for the identified pending action; and
      electronically sending, based upon the user input indicating the unavailability of the user and the completion time, a first message to the second participant, wherein the completion time identifies a time at which the identified pending action is to be completed by the second participant,
   the graphical user interface includes a control presented to the user and configured to receive the user input, and
   the collaborative environment is an electronic environment in which a plurality of users communicate via one or more electronic communication networks.

2. The system of claim 1, wherein
the sending is based upon an analysis that concludes that the unavailability of the user impacts the second participant.

3. The system of claim 1, wherein
the determining the completion time includes an amount of work already performed by the user on the identified pending action.

4. The system of claim 1, wherein
the first message indicates that the completion time of the identified pending action will be affected by the unavailability of the user.

5. The system of claim 4, wherein
a new completion time is estimated for the identified pending action, and
the first message includes the new completion time for the identified pending action.

6. The system of claim 1, wherein
the identified pending action is automatically rescheduled.

7. The system of claim 1, wherein
in response to determining a user input indicating an availability of the user is not received within a specified period of time subsequent to the user input, a second message is sent to the second participant indicating continued unavailability of the user.

8. The system of claim 7, wherein
a new completion time is automatically estimated for the identified pending action,
the first message includes the new completion time for the identified pending action,
a second new completion time is estimated for the identified pending action, and
the second message includes the second new completion time for the identified pending action.

9. The system of claim 8, wherein
the determining the completion time includes determining a probability percentage that the user will be able to complete the pending action within a period of time.

10. A computer program product, comprising:
a hardware storage device having stored therein computer program code for generating a user unavailability alert in a collaborative environment,
the computer program code, which when executed by a computer hardware system, causes the computer hardware system to perform:
  receiving, by the computer hardware system and from a graphical user interface of a collaboration media client associated with a user, a user input indicating an unavailability of the user;
  automatically retrieving, responsive to the user input, collaboration media associated with the user;
  processing, by a collaboration information collector of the computer hardware system, the collaboration media to generate statistical data;
  automatically identifying, by the computer hardware system and based upon the processing of the collaboration media:
    a collaborative session within the collaborative environment and in which the user participated,
    a pending action to be performed by the user within the identified collaborative session, and
  automatically determining, by the computer hardware system, a completion time for the identified pending action; and
  electronically sending, based upon the user input indicating the unavailability of the user and the completion time, a first message to the second participant, wherein the completion time identifies a time at which the identified pending action is to be completed by the second participant,
the graphical user interface includes a control presented to the user and configured to receive the user input, and
the collaborative environment an electronic environment in which a plurality of users communicate via one or more electronic communication networks.

11. The computer program product of claim 10, wherein
the sending is based upon an analysis that concludes that the unavailability of the user impacts the second participant.

12. The computer program product of claim 10, wherein
the determining the completion time includes an amount of work already performed by the user on the identified pending action.

13. The computer program product of claim 10, wherein
the first message indicates that the completion time of the identified pending action will be affected by the unavailability of the user.

14. The computer program product of claim 13, wherein
a new completion time is estimated for the identified pending action, and
the first message includes the new completion time for the identified pending action.

15. The computer program product of claim 10, wherein
the identified pending action is automatically rescheduled.

16. The computer program product of claim 10, wherein
in response to determining a user input indicating an availability of the user is not received within a specified period of time subsequent to the user input, a second message is sent to the second participant indicating continued unavailability of the user.

17. The computer program product of claim 16, wherein
a new completion time is automatically estimated for the identified pending action,
the first message includes the new completion time for the identified pending action,
a second new completion time is estimated for the identified pending action, and
the second message includes the second new completion time for the identified pending action.

18. The computer program product of claim 10, wherein
the determining the completion time includes determining a probability percentage that the user will be able to complete the pending action within a period of time.

* * * * *